US007257386B1

(12) United States Patent
McDonnell et al.

(10) Patent No.: US 7,257,386 B1
(45) Date of Patent: Aug. 14, 2007

(54) DATA TRANSFER SYSTEM AND METHOD OF DATA TRANSFER

(75) Inventors: James Thomas Edward McDonnell, Bristol (GB); Vijay Machiraju, Mountain View, CA (US); Salil Pradhan, Santa Clara, CA (US); John Deryk Waters, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 214 days.

(21) Appl. No.: 09/715,131

(22) Filed: Nov. 20, 2000

(51) Int. Cl.
*H04Q 7/20* (2006.01)

(52) U.S. Cl. .................. 455/403; 455/426.1; 455/444; 455/41.2; 709/231; 370/342; 370/344; 370/349

(58) Field of Classification Search ............ 455/456.2, 455/452.1, 450, 452.2, 553.1, 456.1, 422, 455/456.3, 418, 419, 41, 426.1, 426, 444, 455/462, 41.2; 375/219; 370/342, 344, 370/347, 349, 335, 337, 449, 319, 320, 322; 709/231
See application file for complete search history.

(56) References Cited

U.S. PATENT DOCUMENTS

| 5,589,838 | A  | * | 12/1996 | McEwan ................. 342/387 |
| 5,754,961 | A  | * | 5/1998  | Serizawa et al. ............ 455/517 |
| 6,198,941 | B1 | * | 3/2001  | Aho et al. ................. 455/552.1 |
| 6,416,414 | B1 | * | 7/2002  | Stadelmann ................. 463/42 |
| 6,453,371 | B1 | * | 9/2002  | Hampson et al. ............. 710/37 |
| 6,470,180 | B1 | * | 10/2002 | Kotzin et al. ............. 455/412.1 |
| 6,493,550 | B1 | * | 12/2002 | Raith ...................... 455/422.1 |
| 6,524,189 | B1 | * | 2/2003  | Rautila ......................... 463/40 |
| 6,577,849 | B1 | * | 6/2003  | Eaton et al. ................ 340/7.43 |
| 6,587,835 | B1 | * | 7/2003  | Treyz et al. .................. 705/14 |
| 6,600,913 | B1 | * | 7/2003  | Brankovic et al. .......... 455/324 |
| 6,665,711 | B1 | * | 12/2003 | Boyle et al. ................. 709/219 |
| 6,742,127 | B2 | * | 5/2004  | Fox et al. ..................... 726/10 |
| 6,985,931 | B2 | * | 1/2006  | Dowling ..................... 709/217 |
| 7,003,283 | B2 | * | 2/2006  | Hiltunen et al. ......... 455/412.1 |
| 7,039,428 | B1 | * | 5/2006  | Helferich .................... 455/458 |
| 7,054,626 | B2 | * | 5/2006  | Rossmann ............... 455/422.1 |
| 7,093,016 | B2 | * | 8/2006  | Kawamoto et al. ......... 709/225 |
| 2002/0013852 | A1 | * | 1/2002 | Janik ......................... 709/231 |
| 2002/0022961 | A1 | * | 2/2002 | Sepanaho ...................... 705/1 |
| 2004/0038675 | A1 | * | 2/2004 | Criss et al. ................. 455/419 |
| 2004/0171378 | A1 | * | 9/2004 | Rautila ...................... 455/419 |
| 2004/0203626 | A1 | * | 10/2004 | Esmailzadeh et al. ... 455/412.2 |

FOREIGN PATENT DOCUMENTS

| EP | 0 998 094    |   | 5/2000  |
| GB | 2 313 981    |   | 12/1997 |
| GB | 2313981      | * | 12/1997 |
| WO | WO 96/36193 A |  | 11/1996 |
| WO | WO 99/35801  |   | 7/1999  |
| WO | 0 954 146 A  |   | 11/1999 |
| WO | WO 00/42787  | * | 7/2000  |

* cited by examiner

*Primary Examiner*—Erika A. Gary
*Assistant Examiner*—Khawar Iqbal

(57) ABSTRACT

The invention relates to a data transfer system and a method of data transfer. The invention aims to provide a high bandwidth channel between a mobile device, such as a mobile telephone and a network storing data, such as the Internet. A standard public land mobile network (PLMN) is used to notify the mobile device that there is data on the network awaiting download. The mobile device user then moves to within range of a high bandwidth short range (HBSR) base station to download the data more quickly than is possible over the PLMN.

30 Claims, 4 Drawing Sheets

DATA TRANSFER SYSTEM AND METHOD OF DATA TRANSFER

The present invention relates to a data transfer system and apparatus and a method of data transfer. More particularly, but not exclusively, it relates to a data transfer system, apparatus and method for telecommunication with a mobile device.

In the present specification the term "mobile device" encompasses but is not limited to all mobile receivers or transceivers of data, for example personal digital assistants, mobile telephones and lap top computers. The term "communications network" and "network" encompasses, but is not limited to computer and telephony networks wherein data is passed over the network between entities/devices connected to the network. "Data" is used to refer to any form of information carried over the network, for example video, telephony, audio or textual information.

As the number of mobile devices connected to public land mobile networks (PLMNs) has increased so has the demand for data transfer over these networks. This has been highlighted by the emergence of wireless application protocol (WAP) technologies which allow, for example, the access of the Internet from a suitably equipped mobile telephone handset.

A problem associated with large scale data transfer over current PLMN is the low data transfer rates available, for example the current Global System for Mobile Communications (GSM) network has a maximum data transfer rate of around 9 kbits$^{-1}$.

It is envisaged that the next generation of mobile devices, utilising the General Packet Radio System (GPRS), will have a maximum data transfer rate of 115 k bits$^{-1}$ and third generation device data maximum transfer rates could be as high as 2 Mbits$^{-1}$.

However, the practically achievable data transfer rates of these systems will be significantly less than these theoretical maximum vales, for example, GPRS achievable data transfer rates may be as low as 30 kbits$^{-1}$.

The disparity between theoretical and achievable data transfer rates is due to the nature of the licensed cellular PLMN frequency spectrum. Each communication channel has a channel capacity associated with it. This channel capacity is shared between all users of a given channel within a cell. Thus, the theoretical maximum data transfer rates refer to a single user of a channel within a cell utilising the channel exclusively. Obviously, this is very seldom the case, particularly in urban environments where it is possible that there may be in excess of 1,000 users within any given cell.

A further implication of this low data transfer rate is increased costs to users as most are billed by their service provider on a time or quantity of data basis. Clearly low data transfer rates will increase data acquisition times and therefore may increase the cost to the user.

It is an object of the present invention to provide a method of data transfer which, at least partly, mitigates at least one of the above-mentioned disadvantages/problems.

It is a further object of the present invention to provide a data transfer system which, at least partly, mitigates at least one of the above-mentioned disadvantages/problems.

It is a yet further object of the present invention to provide a high bandwidth data transfer link adapted for use in a data transfer system which, at least partly, mitigates at least one of the above-mentioned disadvantages/problems.

According to a first aspect of the present invention there is provided method of data transfer including:

Providing first and second communication links of differing bandwidths between a network and a mobile device;

Notifying the mobile device of data awaiting transfer thereto from the network via the first, lower bandwidth, communication link;

And transferring the data to the mobile device via the second, higher bandwidth, communication link.

The method may include providing the first communication link over a PLMN. The PLMN may provide the first communication link in a cellular structure. The first communication link may be effected via a GSM network or alternatively via a GPRS or 3G network.

The method may also include providing the second communication link via a wide band short-range (WBSR) network. Short range is taken to include distances of up to a few tens of meters or up to a few hundreds of meters. The second communication link may be provided via a wireless network or alternatively via a hardwired connection to the mobile device. The second communication link may be provided using any one of IEEE802.11, Bluetooth, or HIPERLAN. The method may further include providing the second communication link at a fixed location. The second communication link may be provided in the unlicensed portion of the electromagnetic spectrum, (e.g. ISM bands). One example of an unlicensed frequency is a few GHZ (eg 2.4 GHZ), or the order of 10 GHZ or a few tens of GHZ.

The first and second communication links may only be temporarily formed.

The method may include the step of notifying the mobile device at a first bit rate which is lower than a second bit rate at which the data is transferred to the mobile device. For example the second bit rate is at least ×5, ×10, ×20, ×30, ×40, ×50, ×100, ×250, >×250, greater than the first bit rate, or in which the second bit rate is between any pair of the above listed values a multiple of the first bit rate.

The first communication link and second communication link may transmit an alert message plus data (alert via first communications link, data via second) such that the rate of the time and/or amount of data transmitted by the first communication link relative to the second communication link is 1:5, 1:10, 1:20, 1:30, 1:40, 1:50, 1:100, 1:200, 1:500, 1:10N, 1:500, 1:1000, 1:5000, 1:10000, or higher.

The notification of the data awaiting transfer may be provided as an SMS message or as an audible signal or as an alert through WAP.

The method may further include the step of providing either or both of the mobile device or/and a location of a base station of the second communication link with GPS sensors thus allowing the nearest location of the second location link to the mobile device to be ascertained.

The method may further include the step of providing a plurality of second communication links at a plurality of locations, for example in/on telephone boxes, at traffic signals, in/on public transport stations.

The method may also include the steps of encrypting the data prior to its transfer to the mobile device; passing a decrypting code to the mobile device via the first communication link; and decrypting the data once received at the mobile device using said decrypting code.

According to a further aspect of the present invention there is provided a method of data transfer to a mobile device comprising:

providing a mobile device communicatable with a first communications network and with a second communication network;

having the device in communication with the first network and transferring a message to the device via the first network, the message being indicative of the fact that data is desired to be transferred to the device;

putting the device in communication with the second network and transferring the data to the device via the second network.

Preferably the second network has the capability of transferring the data to the device more cheaply than if it were transferred over the first network. Preferably the first and second networks have telecommunication links to the device of different bandwidths/or data rates: preferably the second network has a bandwidth/data rate that is significantly higher than that of the first network.

The method may include the step of transferring the message to the device at a bit rate which is lower than the bit rate at which the data is transferred to the device. For example, the second bit rate is at least ×5, ×10, ×20, ×30, ×40, ×100, ×250, or >×250, greater than the first bit rate, or in which the second bit rate is between any pair of the above listed values a multiple of the first bit rate.

Preferably the first network comprises a wireless network, with wireless communication to the mobile device.

The second network may have a wireless link with the device when the device is in range of a second network transmitter and/or receiver.

Preferably the second network has a wireless link to mobile device, with the link preferably being in the unlicensed spectrum (e.g. in the GHz range, possibly in the 2.4 GHz band or thereabouts, e.g. within 10 or 20 or so GHz).

According to a further aspect of the present invention there is provided a method of data transfer including;

providing first and second communication links of differing bandwidths between a network and a mobile device;

entering data onto the mobile device;

notifying the network via the first, lower bandwidth, communication link of data awaiting transfer thereto; and transferring the data to the network via the second higher bandwidth communication link.

According to a further aspect of the present invention there is provided a data transfer system comprising a network, a mobile device, a first transmitter and a second transmitter, the network being adapted to contain data, the mobile device being adapted to receive signals from both the first and second transmitters, the first transmitter being adapted to transmit a signal to the mobile device when data on the network is available to be transferred to the mobile device, the second transmitter being adapted to transmit data to the mobile device.

The network may be an internet or it may be an intranet. Alternatively it may be the Internet. The network may include a telecommunication network. The network may include a public land mobile network (PLMN) which may be cellular. The network may be a cellular telecommunication network. The network may be a GSM network or, alternatively, it may be a GPRS network or it may be a third generation mobile telecommunication network. The network may have at least two network elements. The network may include at least one server.

The first transmitter may be a relatively low bandwidth (data transfer rate) transmitter. The transmitter may be a GSM transmitter, i.e. 9 kbits$^{-1}$ maximum bandwidth or it may be a GPRS transmitter, i.e. 115 kbits$^{-1}$ maximum bandwidth. The first transmitter may operate at a frequency within the range of about 900 MHz to about 1900 MHz. Alternatively or additionally it may generate at a frequency at or near the 2 GHz band. The first transmitter may also be capable of receiving signals from the mobile device. The first transmitter may be a long range transmitter, for example, have a useable range in excess of 100 m, or excess of 500 m, or in excess of a kilometer or more, or several kilometers or more. Typically the first transmitter will have a range of at least 1 km, more typically at least a 5 km. The first transmitter may be a PLMN transmitter and may be a cellular telecommunications transmitter. Alternatively, the first transmitter may be satellite based.

The signal transmitted by the first transmitter may be a digitally encoded signal. The signal may be a textual message, for example a short message service (SMS) signal. The signal may be an audible or a visual signal. The signal may be in the form of a wireless application protocol (WAP) signal. The purpose of the transmitted signal may be to alert a user of the mobile device that data on the network is available for download to the mobile device, in use.

The second transmitter may be a high bandwidth (data transfer rate) transmitter. The transmitter may be a short-range transmitter for example having a range of up to a few hundred meters, more typically a few tens of meters or ten meters. The transmitter may be a wireless local area network (LAN) base station. The second transmitter may operate at a frequency within the range of the order of a GHz, (e.g. 2.4 GHz or a few GHz), to, say, a few tens of GHz. The transmitter may employ IEEE802 for data transfer, more typically the transmitter may employ IEEE802.11 protocols giving a maximum bandwidth of 11 Mbits$^{-1}$. Alternatively, the transmitter may employ Bluetooth having a maximum bandwidth of 1 Mbits$^{-1}$, or HIPERLAN, having a maximum bandwidth of 23 Mbits$^{-1}$ or 54 Mbits$^{-1}$ (there are two HIPERLAN'S). The second transmitter may be removably hardwired to the mobile device when data transfer is required. The second transmitter may establish a high bandwidth channel with the mobile device.

A plurality of second transmitters may be distributed geographically. The geographic distribution of the second transmitters serves to increase accessibility by users. The second transmitters may be located on/in public telephone boxes. This has the advantage of incorporating a ready means of accessing the network. Alternatively, the second transmitters could be mounted on traffic signals or located on/in public transport or at public transport stations/stops. The second transmitter may operate in an unlicensed portion of the electromagnetic spectrum, typically of the order of tens of GHz. As the second transmitter may act only as a conduit for data it will have only limited memory requirements.

The data may be a digitally encoded form of any one of, or a combination of, text, for example E-mail using the simple mail transfer protocol (SMTP) or facsimile, still video images, for example a JPEG encoded image, moving video images, for example an MPEG encoded image, real time video images or audio.

The mobile device may be a mobile telephone, it may be a personal digital assistant (PDA) or a laptop computer. The means for receiving signals from either, or both of, the first and second transmitters may be in the form of an additional, non-integral component, for example a "card", which can be fitted to the mobile device. An existing mobile device may be converted into one in accordance with the present invention by fitting an appropriate card, or chip or other insert or add-on, or by loading appropriate software.

The mobile device may be fitted with a global positioning system (GPS) sensor, as may the second transmitter. The mobile device may use the GPS sensors signals to determine the closest second transmitter and direct a mobile device user to the closest second transmitter.

Alternatively the mobile device may determine is position by communications with other devices in its vicinity who know their position (e.g. mobile devices which do have GPS, or fixed devices, e.g. street furniture (e.g. lamp post, traffic lights etc.)) by communication over WBSR links, giving an accuracy of a few tens of meters. This allows a mobile device user to be directed to the closest/most convenient second transmitter.

The data may be encrypted. A key may be required to decrypt the data. The key may be a public key. The public key may originate from the public key infrastructure. The use of encryption and public keys increases the security of the data downloaded onto the mobile device. The data may be electronically watermarked. There may be an electronic authentication certificate associated with the public key.

According to a yet further aspect of the present invention there is provided a converter device adapted for use with a network having an interface, suitable to interface with a mobile device and a wide band communication link such that the device is capable of allowing the mobile device to perform any of the preceding methods according to the present invention, thereby converting a mobile device into a mobile device in accordance with the present invention.

According to a yet further aspect of the present invention there is provided a wide bandwidth short range transceiver adapted to mediate a flow of data between a mobile device and a network in response to a request from said mobile device, the mobile device having received a notification that the data is awaiting transfer via a wireless network, e.g. cellular network or satellite based.

DESCRIPTION OF THE PREFERRED EMBODIMENTS

A data transfer system and a method of data transfer, each embodying the invention, will now be described, by way of non-limiting example, with reference to the accompanying diagrammatic drawings, in which.

Figure 1:
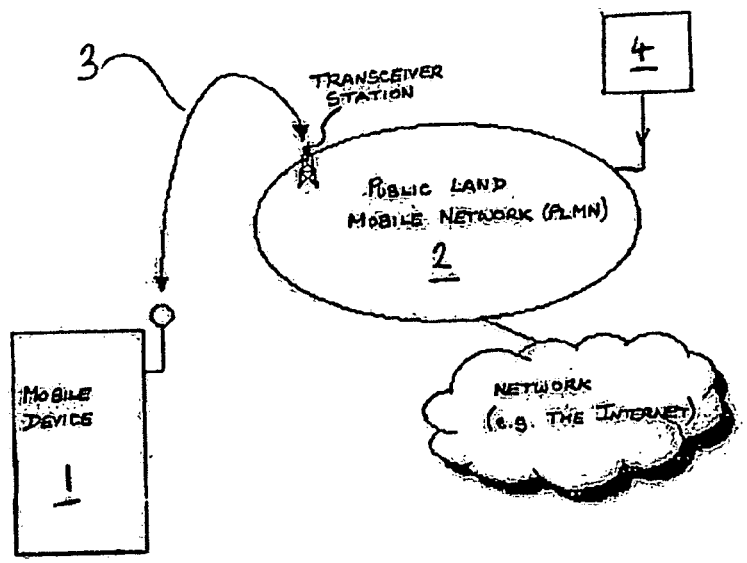
FIG. 1 is a diagram of a known prior art data transfer system comprising a network, for example the internet, connected to a PLMN which transfers data from the network to a mobile device.

FIG. 1 shows a mobile device 1 (in this case a personal digital assistant, PDA) communicable with a PLMN2 via a wireless link 3. A remote device 4 wishing to send the PDA 1 data accesses the PLMN2 and sends the data over the PLMN2 and link 3. The data is sent out, say 9.6 Kbits$^{-1}$. This makes high data transfer rate application difficult or impossible. For example video conferencing typically requires a higher data transfer rate.

Figure 2:
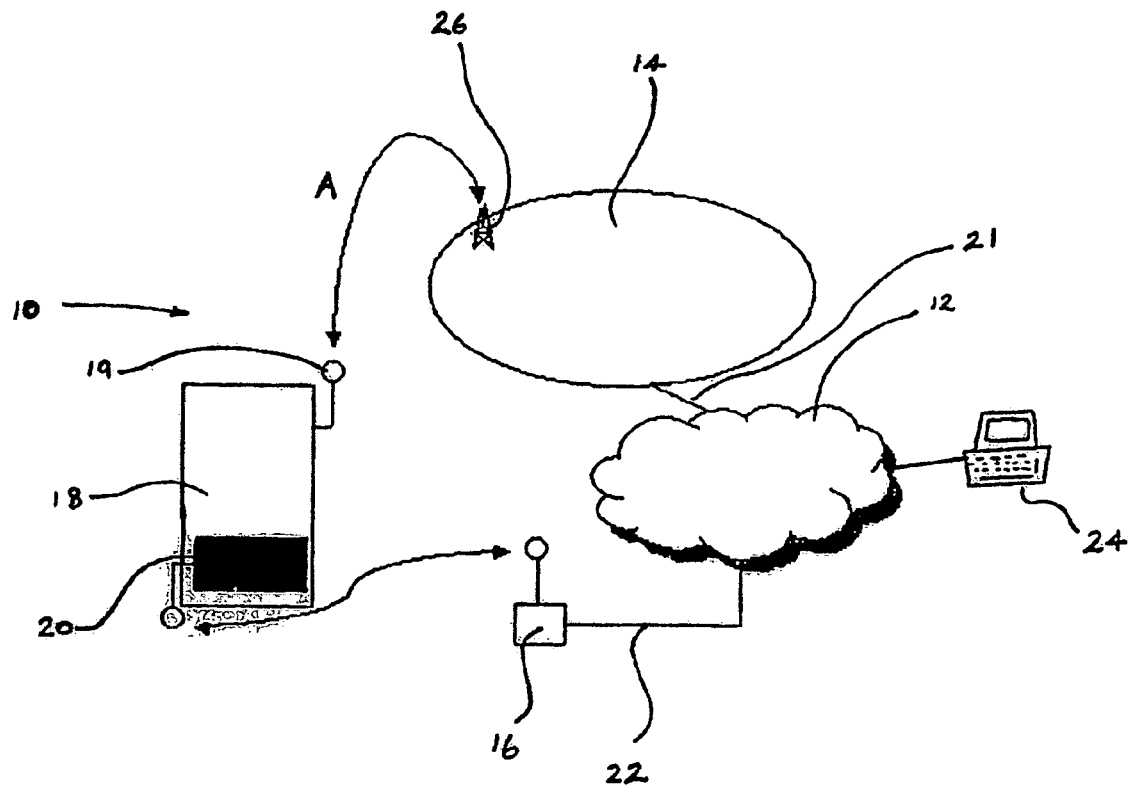
FIG. 2 is a diagram of a data transfer system comprising a network, to both a PLMN and a wide bandwidth short range (WBSR) base station and a mobile device capable of communicating with both the PLMN and the WSBR wireless link.

FIG. 2 is a diagram of a data transfer system embodying the invention. The data transfer system 10 includes a network 12 (e.g. a land/fibre/wire-based network), a PLMN 14, a WBSR (Wide Band Short Range) base station transceiver 16 and a mobile device 18, again in this example a PDA.

The mobile device 18 has a first transceiver 19 capable of two-way communication with the PLMN 14 and also a second transceiver 20 capable of communicating with the WBSR base station 16. The transceiver 20 in this example is capable of 2-way communication with its base station 16, but in another example it may be capable of receive only.

The network 12 may be the Internet and is connected to the PLMN 14 and the WBSR base station 16 by respective transmission links 21, 22. These would typically not be wireless, but wire, or optical fibre hard connections.

Data resident upon the network 12 can either be requested by a user of the mobile device 18 or can be sent to the mobile device 18 from a network element, such as a computer, present on the network 12. The network element sending the information to the mobile device 18 may be connected to the network 12 only temporarily.

When data upon the network 12 is addressed to the device 18 a message is routed along the land-line link 21 to the PLMN 14. The PLMN 14 locates the mobile device 18 within its cellular structure and passes the message to an appropriate transceiver station 26. The message comprises a notification that data is awaiting transfer from the network 12 to the device 18 and this message is passed from the station 26 to the first transceiver 19 of the device 18 (notified by the arrow A is FIG. 2) by wireless transmission.

Upon receipt of a "data is waiting" message a user of the mobile device 18 decides whether they wish to receiver the data from the network 12 via the low bandwidth PLMN 14 connection, this typically having a data transfer rate of 9 kbits$^{-1}$ for GSM and an average data transfer rate of 30 kbits$^{-1}$ for GPRS, or whether the user wishes to move to within range of a WBSR base station 16 (if they are not already in range).

The message transmitted to the device 18 via the wireless link A may include one or more of the following: the amount of data to be transmitted; the time it will take to transmit the data via the PLMN 14; the cost of the telephone call/telecommunication charge if they choose to transmit the data to the device via the PLMN; an indication of the level of urgency that the sender of the data thinks the recipient should give to receiving the data; the location of, directions to, distance to, or time to, at least one (preferably the nearest) WBSR base station (or the WBSR base station that is estimated will enable the user to download the data fastest). Another embodiment also gives distance/time to a selection of nearest WBSR base stations—some may have a queue or better data transfer rates.

Should the user decide to use the PLMN 14 connection the transfer of data from the network 12 to the device 18 proceeds according to the prior art configuration discussed hereinbefore.

If the sender of the information provides the option to download the data from the network 12 via the WBSR base station 16 the data can be optionally encrypted by the sender by software provided by a network element, for example the computer 24, or a programmable logic array (PLA) or E$^2$PROM. If the data is encrypted a decryption public key and authentication certificate, for example, of the type generated by the public key infrastructure (PKI), can be passed via the link 21, PLMN 14 and station 26 to the mobile device 18. This passing of the public key to the mobile device 18 via a separate transmission path, the PLMN 14, to the data clearly enhances the security of the system 10.

The data, which can be of any form, e.g. text, audio or visual signals or any combination of the three, remains within the network 12 until the user brings the device 18 within range, typically tens of meters, of the WBSR base station 16 and a request is made by the user via the device 18 and base station 16 to download the data from network 12.

When a request to download the data is received by the network 12 the network knows which WBSR base station 16 to route the data to (there will be many WBSR base stations on the network). The data is passed to the correct WBSR link and through the WBSR base station 16 to the second transceiver 20 of the device 18.

Of course, in an alternative system the receiver/user of the mobile device may be able to select which WBSR base station, out of a choice of them, will receive the data, possibly in advance of being within range of the WBSR base station. When the user decides to have the data sent to a WBSR base station for downloading to his device 18 the system may send it to the selected base station then, without waiting for the device to be in communication with the station 16, the data being stored at the WBSR station 16 for downloading. This may allow for slower rates of data transfer to the WBSR station because there will be a delay in the device 18 requesting the data from the station 18 because it will have to get there first (within the physical proximity).

As the WBSR base station 16 in many embodiments acts only as a conduit for the flow of data it may require only a small amount of buffer memory. This low memory requirement would increase the speed and reduces the power requirements, of the WBSR base station.

A further refinement of the present invention allows a user of the mobile device to transfer data onto the network 12. The user enters or loads the data onto the mobile device 18. The mobile device 18 can determine whether it is preferable to upload the data onto the network via the PLMN 14 or the WBSR base station 16. This decision may be made from a pre-programmed "cost-benefit" type analysis which may include such criteria as amount of data to be uploaded, estimated time/cost of upload via PLMN 14 and distance to the nearest/most convenient WBSR base station 16. The data to be uploaded can, in an embodiment, be split into a first, minor, portion which is transmitted via the PLMN 14 and a second, major, portion which is transmitted when the mobile device 18 is within range, typically a few tens of meters or a WBSR band station 16. Alternatively, the data could be onto the network 12 in a single block via either the PLMN 14 or the WBSR base station 16. Alternatively, the data could be uploaded onto the network 12 in a single block via either the PLMN 14 or the WBSR base station 16. There may be software at the base station which assesses the data and generates a suitable information "data waiting" message to be sent by conventional mobile phone e.m. spectrum.

The first, minor, data portion is a notification message similar to that in the embodiment detailed hereinbefore.

The wireless technologies used in the WBSR base station to mobile device data transfer are typically, one of Bluetooth, IEEE 802.11 or HIPERLAN.

Typical mobile devices include mobile telephones, personal digital assistants (PDA's) and laptop computers.

It will be appreciated that the mobile device need not have means for communicating with a WBSR base station mounted integrally therewith, for example such means could be mounted upon a card which is inserted in a port in the mobile device. Alternatively the communication means may take the form of a computer program which re-programs the mobile device to allow it to interface with a WBSR base station.

Figure 3:
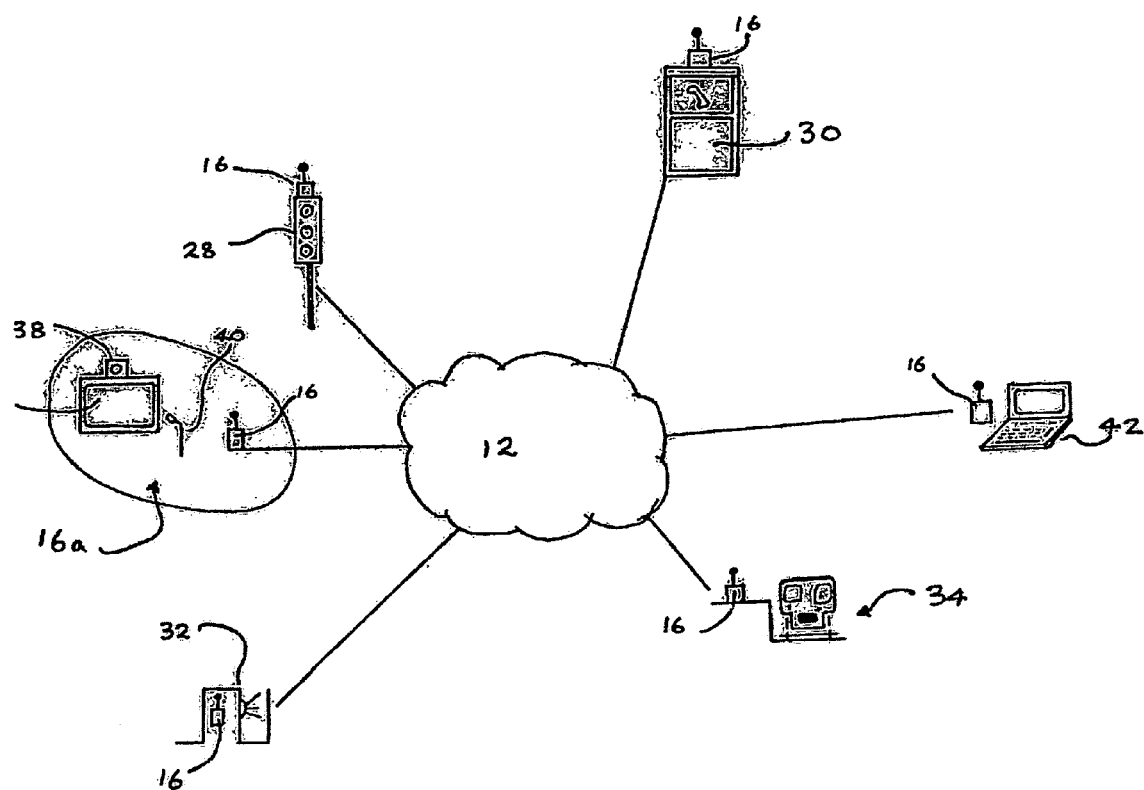
FIG. 3 is a schematic representation of a geographically distributed array of WBSR base stations linked to a network.

FIG. 3 shows a schematic representation geographically distributed array of WBSR base stations 16 connected to a network 12. The stations 16 are mounted on various platforms including a traffic signal 28, a telephone kiosk 30, a turnstile 32, for example at a sports stadium or subway station, and at a rail station (or other public transport depot) 34. The PLMN 14 could notify a user that a party wishes to video conference with them (as a common example of a high data-rate activity). The user could then locate a WBSR 16*a* which has been adapted for video conferencing by the provision of a screen 36, camera 38, microphone 40, and a booth 41 (for privacy) or could video conference via a computer 42 or via their mobile device 18 if it had a camera, screen microphone, and speaker (the booth or private area would then not need video conferencing equipment).

The WBSR base stations can be situated in any area where there will be a significant density of potential users, or where a lot of users will pass by (e.g. a gateway entrance to a building or mall). The number of WBSR base stations will depend upon a variety of factors including increasing the number of transceivers in areas where there is a high density of users, such as shopping malls, in order to maintain high data transfer rates.

An attraction of such sites as telephone kiosks is that they already have telecommunication links. An attraction of traffic signals and turnstiles (e.g. subway turnstiles) is that they already have a power-supply. Also at traffic signals the traffic may come to a standstill, which will facilitate data transfer; the mobile device will dwell in the vicinity of the base station for a significant amount of time, time enough for data transfer. Another possible site for mounting the base stations 16 is at post boxes.

Figure 5:
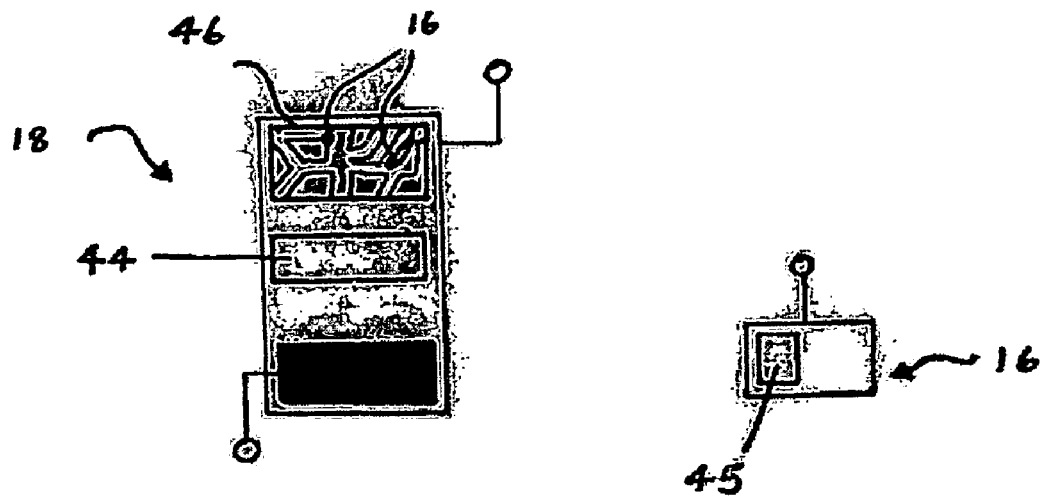
FIG. 5 is a schematic representation of a data transfer system according to the present invention, incorporating GPS.

As shown in FIG. 5, and WBSR base stations 16 the mobile device 18 may have respective GPS transceivers 44, 45 built into them. These GPS transceivers 44, 45 allow the mobile device 18 to estimate which WBSR base station 16 is the nearest to the present position of the mobile device 18. It is possible that the mobile device 18 may have a map 44 of its locale programmed into it (or downloadable to it) and will be able to display the map showing locations of the WBSR base stations 16 in order to direct the user to the nearest/most convenient WBSR base station 16. The map may be automatically updated via the PLMN 14 at such time as the mobile device 18 enters a different cell. Alternatively, directions (or the address or location) may be displayed/ audio presented to the user without actually displaying a map. Some mobile devices may not have a display screen.

The mobile device 18 may have a "learn" facility whereby it learns a users usual route or a daily pattern of movement and can therefore direct the data to a convenient WBSR base station 16. This convenient WBSR base station 16 may not be the nearest base station but one may be passed by the user during their ordinary daily movements.

Figure 6:
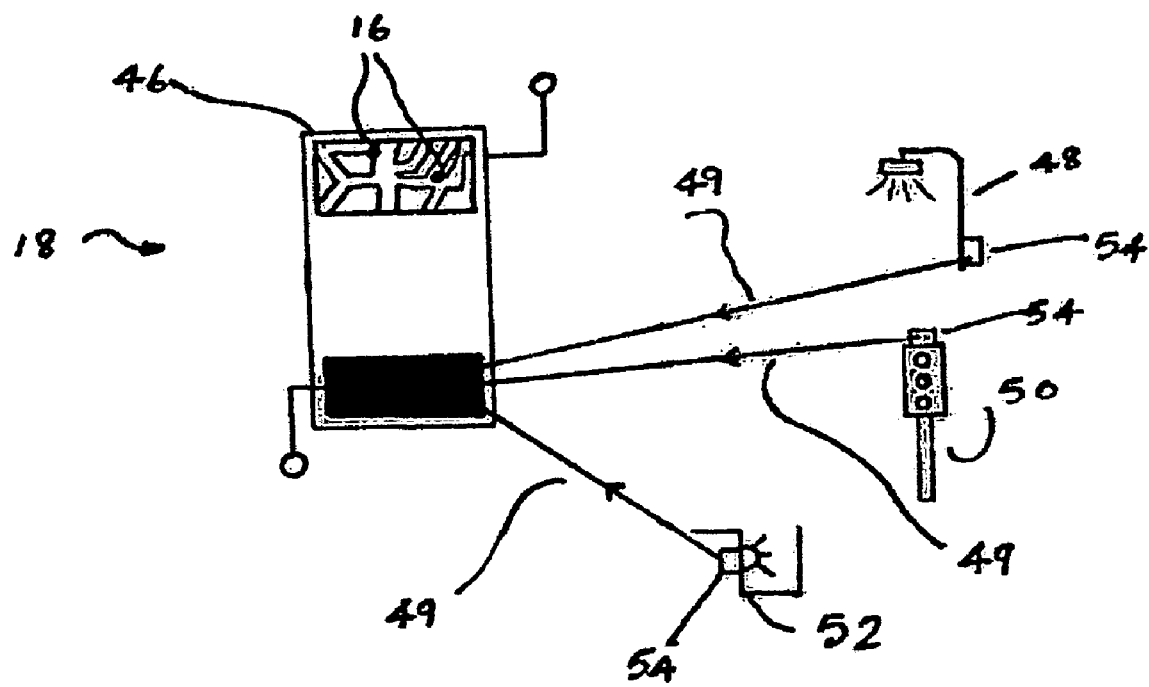
FIG. 6 is a schematic representation of a data transfer system according to the present invention capable of position location.

Alternatively, as shown in FIG. 6, the mobile device 18 may not have position awareness but may communicate via a WBSR link 49 with fixed bodies, for example street lights 48, traffic signals 50, or turnstiles 52, which have GPS transceivers 54 mounted thereupon. The mobile device 18 can use the positional data obtained from the fixed bodies in order to estimate its own position and which WBSR base station 16 is the nearest/most convenient. The device 18 could additionally or alternatively communicate with other mobile devices that do have GPS facility and know their position.

Figure 4:
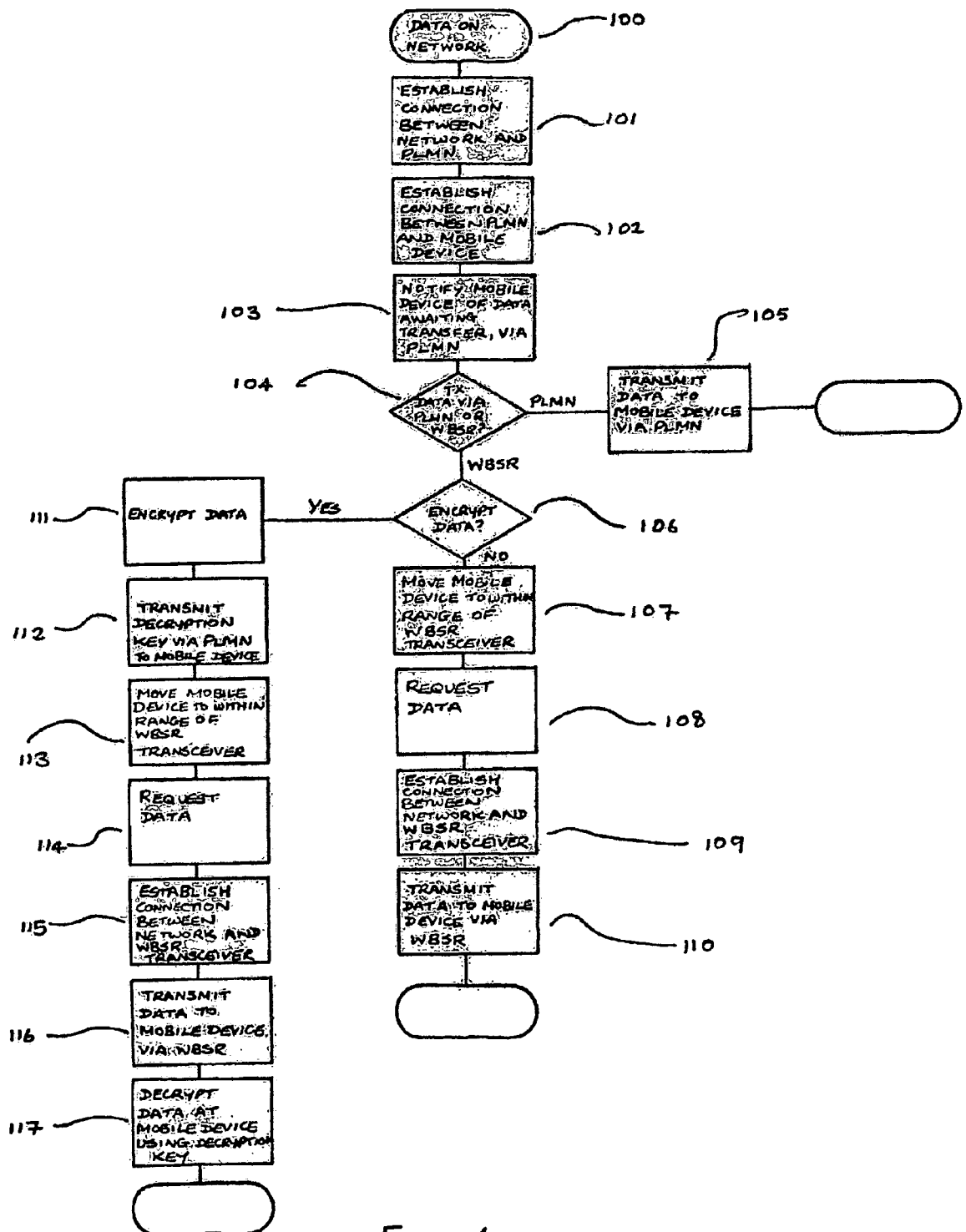
FIG. 4 is a flow chart illustrating a method of data transfer of the system of FIG. 2 including optional public key security.

FIG. 4 is a flow chart showing the processes involved in the transfer of data according to the method of the present invention.

Data is put onto the network in some way (not shown), data which is resident upon the network 12 (step 100) and is addressed to the mobile device 18 causes a connection to be established between the network 12 and the PLMN 14 (step 101) and prompts the formation of a connection between the PLMN 14 and the mobile device 18 (step 102).

The mobile device 18 is passed a notification that there is data awaiting transfer (step 103) and the user decides whether to download the data via the PLMN 14 or via a WBSR base station 16 (step 104).

Should the user choose to download the data via the PLMN 14. The data is transmitted in the conventional, prior art, way (step 105).

Should the user decide to transfer the data over WBSR connection a choice as to whether to encrypt that data, or not, is made either by the user or as a or as a privacy flag set by the sender (step 106). This choice need not be present as encryption may not be present in the system or may be automatic dependent upon the infrastructure provided by the service provided.

If it is decided not to encrypt the data the mobile device 18 must be brought with the transmission range of a WBSR base station 16 (step 107) and a request for the data from the network 12 made. (step 108). Typically, it may be necessary to be within a few tens of meters of the base station 16 for telecommunication with it (e.g. within 10 m or so).

This request for the data is relayed by the WBSR station back to the network in order that the data can be addressed to the correct WBSR base station 16 and a connection established between the network 12 and WBSR base station 16 (step 109).

The data is then passed to the WBSR base station via the connection and is transmitted to the mobile device 18 via the WBSR base station (step 110).

If the option to encrypt the data is chosen the data is encrypted using a known technique such as the public key infrastructure (step 111) and the decryption key and authentication certificate is passed over the PLMN to the mobile device (step 112). The establishing of a connection and transmission of data is the same as for the non-encrypted case (steps 113, 114, 115, 116).

The encrypted data is decrypted at the mobile device using the decryption key passed over the PLMN (step 117).

It will be appreciated that in some embodiments the WBSR stations 16 communicate with the mobile device 18 using the unlicensed spectrum of wavelengths—i.e. free (no payment to licensor of spectrum/reserved frequencies). Thus a large amount of data can be transferred at a lower cost than using the PLMN for the whole of the data. Just a short alerting message can be sent on the expensive PLMN and the vast majority of the data sent on the much cheaper Internet/other cheap network to the right base station 16, which will then use unlicensed spectrum. This means that if cost of the wireless transmission of the data is a significant factor in the overall cost of transferring the data the wireless part of the data transfer can be done over the unlicensed spectrum, and so high data rates are not so important since a long "call" is not costing much.

In other embodiments the mobile device and the base station may communicate via the licensed spectrum instead of the unlicensed (or as well as using unlicensed spectrum).

For example, preferential prices for use of one or more licensed bands may be available for the base station-mobile device communication. If this were so there would still be a cost saving for the user to take their mobile device to the base station.

Furthermore, because of the short-range nature of the WBSR base station it is unlikely that for any one base station there will be too many users within range and so at any one time its bandwidth will not have to shared by too many people. This means that higher data transfer rates can be achieved in practice; data rates that are high enough for video teleconferencing, for example. Data rates of 10 Mbits$^{-1}$, 20 Mbits$^{-1}$, and higher are envisaged. This compares well with Bluetooth and IEEE 802.11 which can achieve around 1 Mbits$^{-1}$ and 11 Mbits$^{-1}$ respectively.

It will also be appreciated that the connection between the device 18 and the base station 16 could be a wired connection (e.g. plug the device into a port), but wireless telecommunication had advantages. For example a person could have their data automatically transferred to them as they walked past a mass transit turnstile or doorway, without having to stop specifically to collect it.

It will also be appreciated that the data transmitted via the first and/or second communication link could be any sort of data. For example it could be voice, voice plus video image, just static data (eg. text or documents or images), or indeed anything.

The invention claimed is:

1. Apparatus for transferring data from a network to a mobile device comprising:
  a transmitter arrangement having differing narrow and wide bandwidth links for transmitting data from the network to the mobile device, the transmitter arrangement being arranged for notifying, via the narrow bandwidth link, the mobile device of data awaiting transfer thereto from the network, the transmitter arrangement being arranged for transferring the data to the mobile device via the wide bandwidth link and the narrow bandwidth, the wide bandwidth link having a shorter range than the range of the narrow bandwidth link; and
  an arrangement for transferring the data from the network to the mobile device and for causing transfer of the data, via the wide bandwidth link, to the mobile device unless the mobile device is outside of the range of the wide bandwidth link, in which case the data are selectively immediately transferred to the mobile device via the narrow bandwidth or are subsequently transferred to the mobile device via the wide bandwidth link when the mobile device is in range of the wide bandwidth link.

2. The apparatus according to claim 1 wherein the narrow bandwidth link is adapted to transmit data indicative of the time it will take to transmit the data.

3. The apparatus according to claim 2 wherein the narrow bandwidth link is adapted to transmit data indicative of the cost to transmit the data via the narrow bandwidth link.

4. The apparatus according to claim 1 wherein the narrow bandwidth link is adapted to transmit data indicative of the cost to transmit the data via the narrow bandwidth link.

5. A method of data transfer by using first and second communication links of differing bandwidths between a network and a mobile device, the first link having a narrower bandwidth and longer range than the second link, the method comprising:

notifying the mobile device of data awaiting transfer thereto from the network by transmitting a first signal from the network to the device via the first link;

transferring the data from the network to the mobile device by transmitting a second signal from the network to the device via the first link or the second link; and the transfer to the mobile device occurring via the second link immediately after the notifying step only if the mobile device is in the range of the second link, the transfer to the mobile device selectively occurring (a) immediately after the notifying step via the first link if the mobile device is not in the range of the second link or (b) subsequently to the notifying step via the second link when the mobile device is in the range of the second link.

6. The method of claim 5 wherein the selective transfer is executed in response to a user input at the mobile device.

7. The method of claim 5 wherein the selective transfer is executed by software on the mobile device.

8. The method of claim 5 wherein the selective transfer is executed by software present on a base station of the network, and further including transmitting data corresponding to the selective transfer to the mobile device via the first link.

9. The method according to claim 5 wherein the first link includes a public land mobile network.

10. The method according to claim 5 wherein the second link includes a wireless network.

11. The method according to claim 10 wherein the first link includes a public land mobile network.

12. The method according to claim 5 wherein the second link includes an unlicensed portion of the electromagnetic spectrum.

13. The method according to claim 12 wherein the first link includes a licensed portion of the electromagnetic spectrum.

14. The method according to claim 5 wherein the first link includes a licensed portion of the electromagnetic spectrum.

15. The method according to claim 5 further including only temporarily forming at least one of the first and second links.

16. The method according to claim 5 further including transferring data to the mobile device from a second network via another wide bandwidth link after the mobile device has been notified via a narrow bandwidth link that it is to receive data from the second network.

17. The method according to claim 5 further including the steps of:

transferring a decryption key from the network to the mobile device via the first link; and then transferring the data in encrypted form, based on the key, from the network to the mobile device via the second communication link.

18. The method according to claim 5 further including the step of determining the location of at least one of the mobile device and a base station of the second communication link by using GPS.

19. A converter device for use with a mobile telecommunications device and being adapted for use with a network, the converter device having an interface adapted to interface with (a) said mobile telecommunications device and (b) a wide bandwidth communication link such that the converter device is capable of causing the mobile telecommunications device to perform the method of claim 5.

20. The method according to claim 5 wherein the narrow bandwidth link transmits data indicative of the time it will take to transmit the data.

21. The method according to claim 20 wherein the narrow bandwidth link transmits data indicative of the cost to transmit the data via the narrow bandwidth link.

22. The method according to claim 5 wherein the narrow bandwidth link transmits data indicative of the cost to transmit the data via the narrow bandwidth link.

23. A data transfer system comprising:

a network, a mobile device, a first transmitter and a second transmitter, the network being adapted to contain data, the mobile device being adapted to receive signals from both the first and second transmitters, the first transmitter being adapted to transmit a first narrow bandwidth long-range signal to the mobile device via a first narrow bandwidth long-range channel, the first signal indicating data on the network are available to be transferred to the mobile device, the second transmitter being adapted to transmit to the mobile device via a second wide bandwidth short-range channel, a second wide bandwidth short-range signal including the data, the mobile device and the first transmitter being arranged for selectively causing the first transmitter to transmit the data via the first channel and enabling the mobile device to selectively receive the data via the first and second channels; the network being adapted to respond to a transmission resulting from an input by a user of the mobile device that the user wants to receive the data by transmitting the data to the second transmitter.

24. A system according to claim 23, wherein the first transmitter is arranged to operate at a frequency within the range selected from group (i) about 900 MHz to about 1900 MHz; (ii) about the 2 GHz band.

25. A system according to claim 23, wherein the second transmitter is arranged to operate at a frequency within the range of the order of 1 GHz to the order of a few tens of GHz.

26. A system according to claim 23, wherein the second transmitter includes a wireless LAN base station.

27. A system according to claim 23, wherein a plurality of the second transmitters are located at geographically different places.

28. A system according to claim 23, wherein the mobile device includes a GPS transceiver associated with it.

29. A system according to claim 23, wherein the second transmitter is arranged to transmit the position thereof via the second channel.

30. A method of transferring data between a mobile device arrangement and a network arrangement via first and second communications links between the device arrangement and network arrangement, the first and second links respectively having narrow and wide bandwidths and long and short ranges, the method comprising:

sending a first narrow bandwidth signal from a first of the arrangements to the second of the arrangements via the first link, the first signal indicating that the first arrangement is ready to transmit data to the second arrangement, then sending a second wide bandwidth signal from the first arrangement to the second arrangement via the second link, the second signal including the data; and scheduling the sending of the data from the first arrangement to the second arrangement via one of the first and second links, and transferring the data from the first arrangement to the second arrangement via one of the first and second links based on the schedule.

* * * * *

UNITED STATES PATENT AND TRADEMARK OFFICE
CERTIFICATE OF CORRECTION

| | | |
|---|---|---|
| PATENT NO. | : 7,257,386 B1 | Page 1 of 1 |
| APPLICATION NO. | : 09/715131 | |
| DATED | : August 14, 2007 | |
| INVENTOR(S) | : James Thomas Edward McDonnell et al. | |

It is certified that error appears in the above-identified patent and that said Letters Patent is hereby corrected as shown below:

On the Title page, in field (56), under "Foreign Patent Documents", in column 2, line 6, delete "WO 0 954 146 A   11/1999" and insert -- EP 0 954 146 A   11/1999 --, therefor.

Signed and Sealed this

Eighteenth Day of November, 2008

JON W. DUDAS
*Director of the United States Patent and Trademark Office*